United States Patent
Hara et al.

(10) Patent No.: US 8,356,729 B2
(45) Date of Patent: Jan. 22, 2013

(54) MATERIAL METERING SYSTEM

(75) Inventors: Hiroshi Hara, Hirakata (JP); Atsushi Houri, Hirakata (JP); Toru Ueda, Hirakata (JP)

(73) Assignee: Kabushiki Kaisha Matsui Seisakusho, Osaka (JP)

( * ) Notice: Subject to any disclaimer, the term of this patent is extended or adjusted under 35 U.S.C. 154(b) by 778 days.

(21) Appl. No.: 12/312,557

(22) PCT Filed: Nov. 15, 2007

(86) PCT No.: PCT/JP2007/072175
§ 371 (c)(1),
(2), (4) Date: Aug. 31, 2009

(87) PCT Pub. No.: WO2008/059920
PCT Pub. Date: May 22, 2008

(65) Prior Publication Data
US 2010/0051643 A1    Mar. 4, 2010

(30) Foreign Application Priority Data
Nov. 17, 2006 (JP) .................. 2006-310961

(51) Int. Cl.
*G01F 11/00* (2006.01)
(52) U.S. Cl. .............. 222/1; 222/55; 222/56; 222/181.1
(58) Field of Classification Search .............. 222/55–56, 222/58, 63, 77, 638–639, 181.1, 185.1, 162, 222/181.2, 434, 380, 425, 428, 1; 177/25.18
See application file for complete search history.

(56) References Cited

U.S. PATENT DOCUMENTS

| | | | | |
|---|---|---|---|---|
| 4,569,406 A | * | 2/1986 | Pringle et al. | 177/25.18 |
| 5,423,455 A | * | 6/1995 | Ricciardi et al. | 222/1 |
| 5,767,453 A | * | 6/1998 | Wakou et al. | 177/25.18 |
| 6,161,733 A | * | 12/2000 | King | 222/380 |
| 7,665,636 B2 | * | 2/2010 | Ederer et al. | 222/409 |
| 2004/0245283 A1 | * | 12/2004 | Kawanishi et al. | 222/56 |

FOREIGN PATENT DOCUMENTS

| | | |
|---|---|---|
| JP | S60-082818 | 5/1985 |
| JP | S63-279120 | 11/1988 |
| JP | H3-248024 | 11/1991 |
| JP | H6-12288 | 2/1994 |

* cited by examiner

*Primary Examiner* — Frederick C. Nicolas
(74) *Attorney, Agent, or Firm* — DLA Piper LLP (US)

(57) ABSTRACT

A material metering method which is executed by way of multistage metering including a memory in which a target metering time for the each stage of metering except for a first stage of metering is memorized, each of the target time including unstable metering time for drop amount of material whose drop amount per unit time after changed from prior stage of the metering is unstable; a metering time measuring unit for measuring an actual metering time at the each stage of metering; and a set value correction unit for correcting the supply mass switch value at each stage of the metering except for the first stage of metering based on the target metering time and the actual metering time after performing one batch metering, whereby the entire metering time for subsequent batch metering to be performed is more reduced than one batch metering performed.

5 Claims, 6 Drawing Sheets

MATERIAL METERING SYSTEM

TECHNICAL FIELD

The present invention relates to an improvement of a material metering system for metering material per a fixed amount by supplying material such as powdered or granular material from a hopper.

BACKGROUND ART

Conventionally, one batch metering method is well known such that material stored in a hopper is dropped from a material outlet by opening a flap damper or a slide shutter provided at the lower part of the hopper and is received in a meter having a load cell or a mass measuring means of differential transformer type or of frequency type, and a material discharge is controlled to be stopped when the mass reaches a predetermined amount while executing a real time measurement.

According to this metering control method by mass metering, there is a height difference between the material outlet and the meter, so that the dropping material is further supplied in the meter after the mass metered by the mass measuring means reaches at a predetermined amount and the material outlet is closed. Therefore, in a prior metering control method, the mass of the dropping material depending on the opening degree and the kinds of material is measured in advance and the mass which is obtained by subtracting the value of residual dropping material is set as a target value.

However, the actual amount of residual dropping material is varied at each metering and the accidental error for the predicted value of residual dropping material often becomes large when the outlet is closed and its opening is specifically large. Therefore, a multistage metering is supposed in which the opening degree is made smaller just before material discharge is stopped.

According to such a multistage metering, a large amount of material is supplied by enlarging the opening degree of the material outlet at an initial supply stage and the opening degree is stepwisely reduced depending on the error caused by the value of dropping material just before stopping supply because the opening degree is small. Therefore, rapid metering can be achieved by an initial large amount metering and an accurate metering can be achieved by the final small amount metering.

In this system executing the multistage metering, a target supply mass switch value is determined as a set value at each stage, whether the supply amount reaches the set value is measured at each stage, and the stage is switched to next when it reaches the set value.

The following patent document discloses a metering method in which the supply amount is stepwisely changed at large, middle, and small.

Patent Document 1: Japanese Examined Patent Publication H06-12288-B

DISCLOSURE OF INVENTION

Problems to be Solved in Invention

However, according to such a multistage metering method, the following problems might be caused by executing switch control at each stage.

Like the case when the amount of residual dropping material is generated finally, the dropping material supplied at the previous stage floats when the opening degree is changed to the next stage, at the current metering stage after switching the stage unstable time zone is generated in which the dropping material fed by the opening degree before switching and the material by the opening degree after being switched are mixed and dropped. Namely, metering at each stage except for the first stage requires a predetermined time till the drop amount per unit time at the current stage becomes constant because the affect of the prior stage is left at the beginning of switch.

If such a control is executed that further the stage is switched to the next stage during the unstable time zone which receives the affect from the prior stage, the correlation of time and metering is not predicted and the metering accuracy could be deteriorated. Specifically, when supply is stopped during the unstable time zone at the final stage, the mass caused by the height difference is deviated from the predicted value of residual stopped during the unstable time zone at the final stage, the mass caused by the height difference is deviated from the predicted value of residual dropping material.

Therefore, it is required to set the metering time of each stage except for the first stage larger than the unstable time for accurate metering. On the other hand, it is also required to execute a large amount metering at the first stage for a long time in order to more rapidly execute metering, so that it is necessary to distribute and adjust the supply time among the stages in order to meter accurately and rapidly.

However, the metering time at such a stage is obtained by controlling metering of load cell, so that it is extremely difficult to control the rate (distribution) at each stage by the metering time and an appropriate adjustment method among the stages has been desired in order to reduce the entire metering time and achieve accurate metering.

The present invention is proposed considering the above-mentioned problems and its object is to provide a material metering system capable of executing an accurate and rapid multistage metering. It is also an object to execute safe and sure metering without failure before achieving optimization.

The material metering system of the present invention is proposed to achieve the above-mentioned objects. The material metering system is executed by way of multistage metering in which material drop amount supplied into a metering device from a material outlet of a hopper per unit time is stepwisely reduced in one batch metering as a stage of metering is changed to subsequent stage of metering, each time the mass value measured with the metering device reaches a supply mass switch value as set in advance for each stage of the metering, thereby performing one batch metering. The system comprises a memory in which a target metering time for the each stage of metering except for a first stage of metering is memorized, each of the target time including unstable metering time for material drop amount whose drop amount per unit time after changed from prior stage of the metering is unstable; a metering time measuring means for measuring an actual metering time at the each stage of metering; and a set value correction means for correcting a supply mass switch value at each stage of the metering except for a first stage of metering by executing a prepared algorism based on the target metering time and the actual metering time after performing one batch metering, whereby the entire metering time for subsequent batch metering to be performed is more reduced than one batch metering performed.

Further according to the material metering system of the present invention, the multistage metering is executed in such a manner that the material drop amount per unit time is reduced by controlling the constricted degree of an opening of the material outlet of the hopper storing material.

Further according to the material metering system of the present invention, the set value correction means optimizes the supply mass switch value at the each stage as the correction is made plural times.

Still further according to the material metering system of the present invention, the set value correction means is capable of executing a standard correction which is based on the difference of the actual metering time and the target metering time and a larger correction larger than the standard correction when the actual metering time so deviates the target metering time that is over a predetermined threshold value.

Effect of the Invention

According to the material metering system of the present invention, a set value correction means is designed to correct the supply mass switch value at each stage except for the first stage by a predetermined algorism based on the target metering time, the actual metering time and the supply mass switch value. Therefore, the supply mass switch value is corrected in such a manner that the metering time at each stage comes close to the target metering time, thereby achieving optimization of the supply mass switch value at each stage for rapid and accurate metering.

Further, according to the present invention in which the supply mass switch value at each stage is optimized by correcting at plural times, a little correction is stepwisely executed so that a safe and sure metering can be executed without failure before obtaining an appropriate value.

Still further according to the present invention which executes one of a standard correction which is based on the difference of the actual metering time and the target metering time or the correction larger than the standard correction when the actual metering time is deviated from the target metering time more than a predetermined threshold value, correction depending on the situation can be executed and the time for optimization can be reduced.

BRIEF DESCRIPTION OF DRAWINGS

FIG. 1 is a diagram of device showing the flow of multistage metering,

FIG. 2 explains a switching point.

EXPLANATION OF REFERENCE NUMERAL 1 meter
2 load cell
11 slide shutter (material outlet)
20 metering process unit
21 control means of opening degree
22 measuring means of metering time
23 set value correction means
24 storage unit

BEST MODE FOR CARRYING OUT THE INVENTION

The embodiments of the present invention are explained referring to the attached drawings.

Embodiment 1

FIGS. 1a to 1d are diagrams showing a multistage metering employed to the material metering system of the present invention. A hopper 10, a feeder, has a slide shutter at the material outlet in the figures, however, a flap damper may be provided.

The reference numeral 10 indicates a hopper storing material P, 11 indicates a slide shutter provided at the material outlet of the hopper 10, 12 indicates a servo cylinder for controlling the opening of the material outlet, and 1 shows a meter having a mass measuring means (load cell) 2. The mass measuring means is not limited to a load cell 2 and may be a differential transformer type or of frequency type.

Figure 1A:
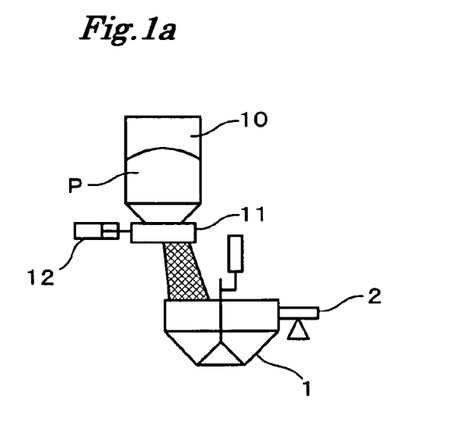
FIG. 1a shows a large amount metering stage.
Figure 1B:
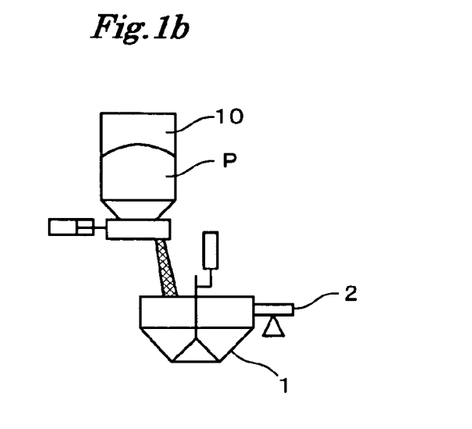
FIG. 1b shows a middle amount metering stage.
Figure 1C:
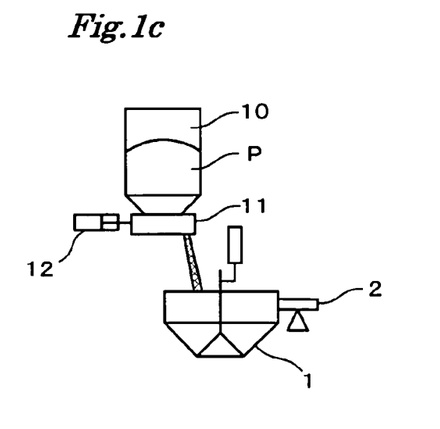
FIG. 1c shows a small amount metering stage.
Figure 1D:
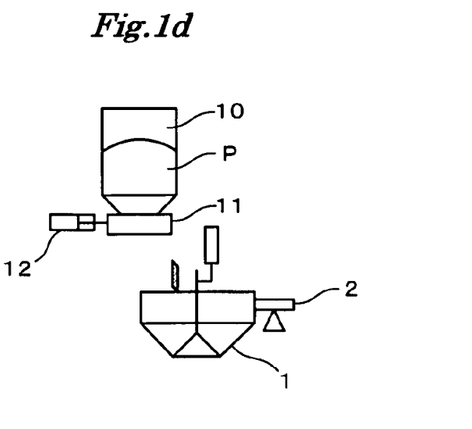
FIG. 1d shows a stopped condition at the small amount metering stage.

FIGS. 1a to 1d diagrammatically show the flow of a multistage metering with the FIGS. 1a, 1b and 1c showing, material supply at a large amount metering stage, a middle amount metering stage, and a small amount metering stage, respectively, and FIG. 1d shows when metering is stopped.

At a first stage of material supply, the opening degree of the slide shutter 11 is large to feed a large amount of material as shown in FIG. 1a, and then the constriction of the slide shutter 11 is controlled so as to reduce the opening degree each time the supply mass switch value at each predetermined stage is satisfied, thereby stepwisely reducing the supply amount as shown in FIGS. 1b and 1c (drop amount of material per unit time).

Reaching the target value at the final small amount metering stage, the material outlet is closed as shown in FIG. 1d. However, there is some height difference between the slide shutter 11 and the meter 1, so that the material which is not yet metered is floating in the air immediately after the slide shutter 11 is closed and the load cell 2 counts the mass even after the slide shutter 11 is closed. The mass of the floating material which is not counted is called the amount of residual dropping material.

Therefore, the target set value for stopping supply of the small amount metering should be determined considering the amount of residual dropping material caused at the time of completing the small amount metering with respect to the final target value (metered value). If the material and equipment are same and the opening degree of the material outlet at a small amount metering stage are also same, it has been empirically known the amount of residual dropping material is substantially constant, although there is some accidental error, so that an accurate multistage metering can be executed using the set value at the final stage considering the actual measured value (the value is called as the value of residual dropping material, namely the value empirically known, to distinguish from the amount of residual dropping material in this specification).

Figure 2A:
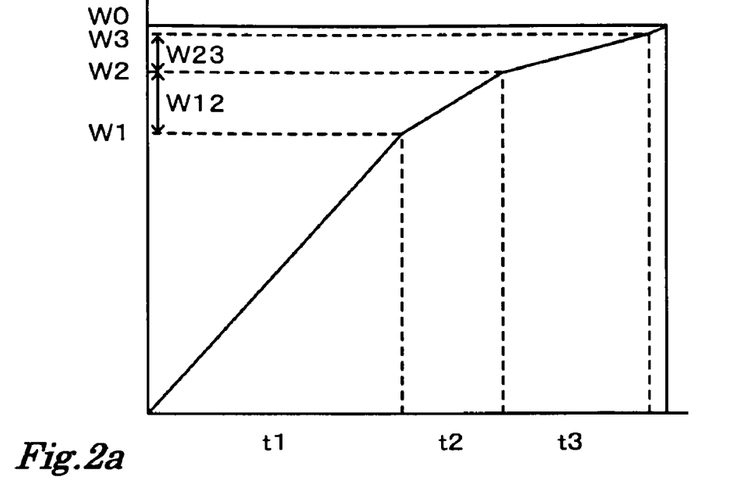
FIG. 2a is a graph showing the relation of the metering mass and time of load cell, and FIG. 2b explains an unstable time zone at switching.
Figure 2B:
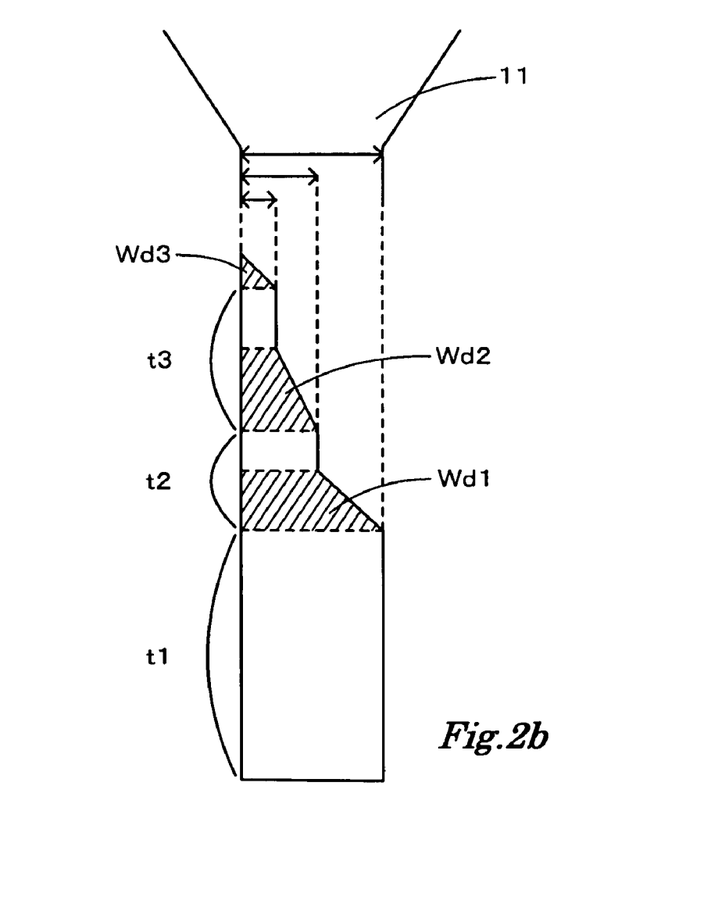

FIGS. 2a and 2b explain a switching point at each stage of multistage metering, FIG. 2a is a graph showing the relation of the mass metered by the load cell and the elapsed time, and FIG. 2b diagrammatically shows the relation of the opening degree of the material outlet and the metered mass in order to explain an unstable time zone at switching.

In FIG. 2a the reference W0 indicates a final target value, W1 is a switch target value from the large amount metering stage to the middle amount metering stage, W2 is a switch target value from the middle amount metering stage to the small amount metering stage, and W1 indicates a final target value considering the value of residual dropping material. The reference numeral W12 indicates a supply mass switch value at the middle amount metering stage calculated during W2 to W1 (metering target value at middle amount metering), W23 is a supply mass switch value at the small amount metering calculated during W3 to W2 (metering target value at small amount metering).

The metering at each stage is shown liner for easy indication in FIG. 2a, however, each stage except for the first stage includes an unstable time zone affected by the previous stage as mentioned above. Actually, metering at each stage except for the first stage includes the metering mass value Wd1, Wd2 at the unstable time zone as shown in FIG. 2b. The reference numeral Wd3 indicates the amount of residual dropping material.

The object of the present invention is to accurately and rapidly execute a multistage metering. For this purpose, it is required that almost all of the material is metered by a large amount metering at the first stage and an accurate correction based on the value of residual dropping material is executed at the following middle amount metering and the small amount metering. According to the present system, the supply mass switch values W12, W23 at each stage except for the first stage are corrected each time completing one batch metering so as to stepwisely reach an appropriate supply mass switch values W12, W23 in order to execute an appropriate metering in accordance with the above-mentioned object.

Figure 3:
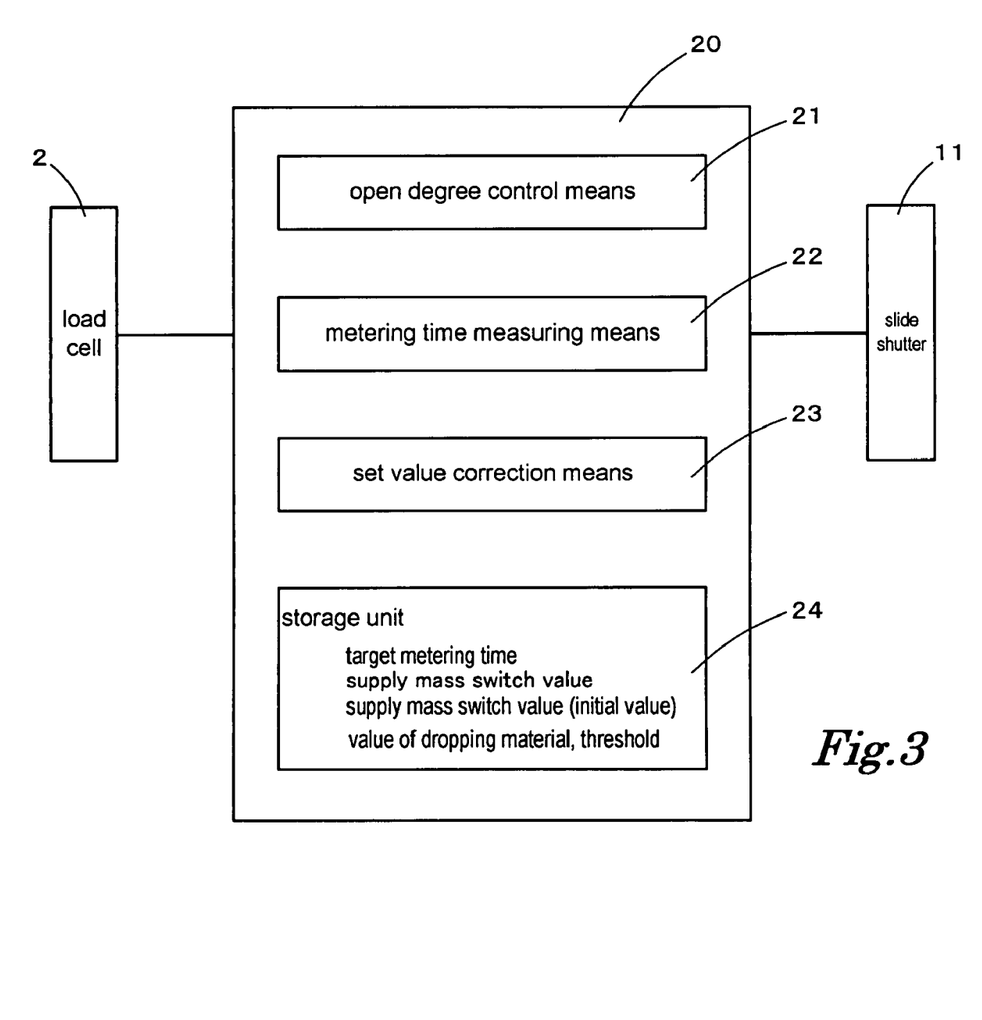
FIG. 3 shows a substantial structure of the system of the present invention.
Figure 4:
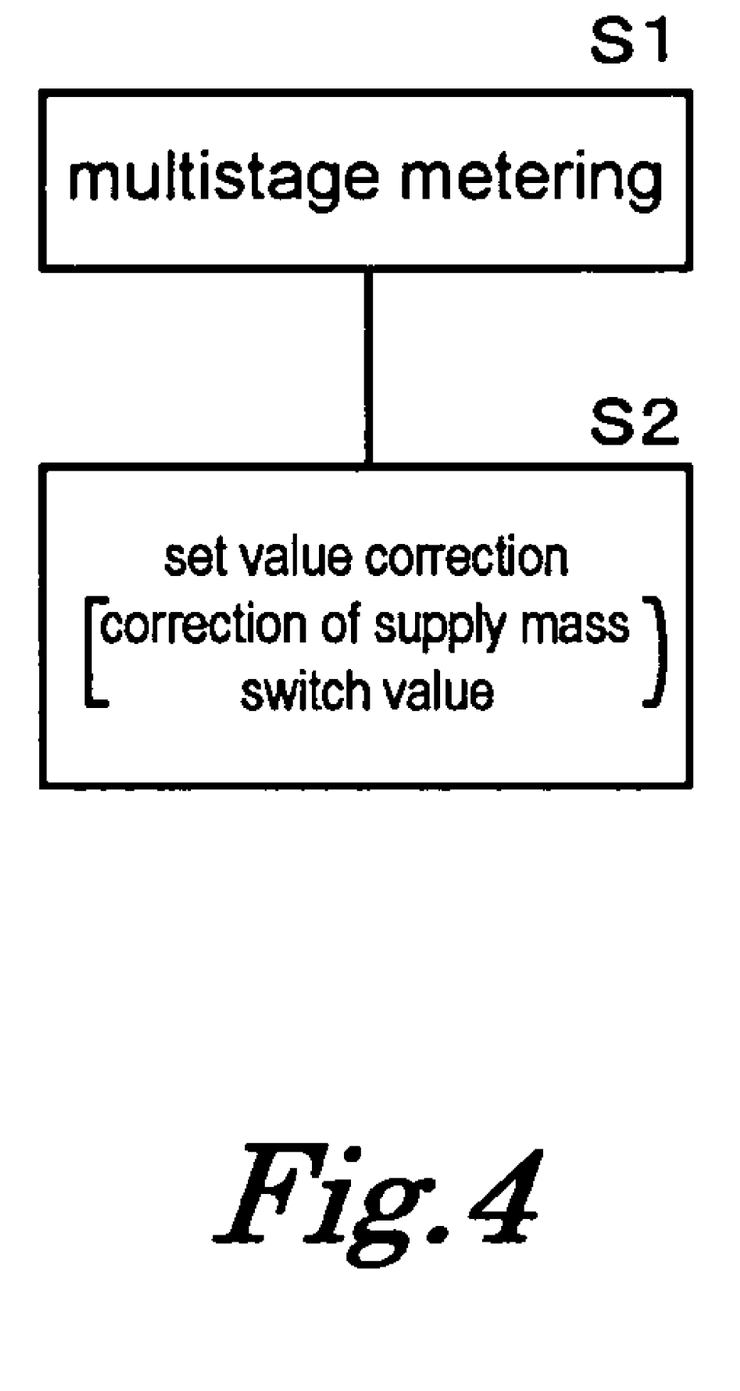
FIG. 4 is a flow chart diagrammatically showing the flow of the present system.
Figure 5:
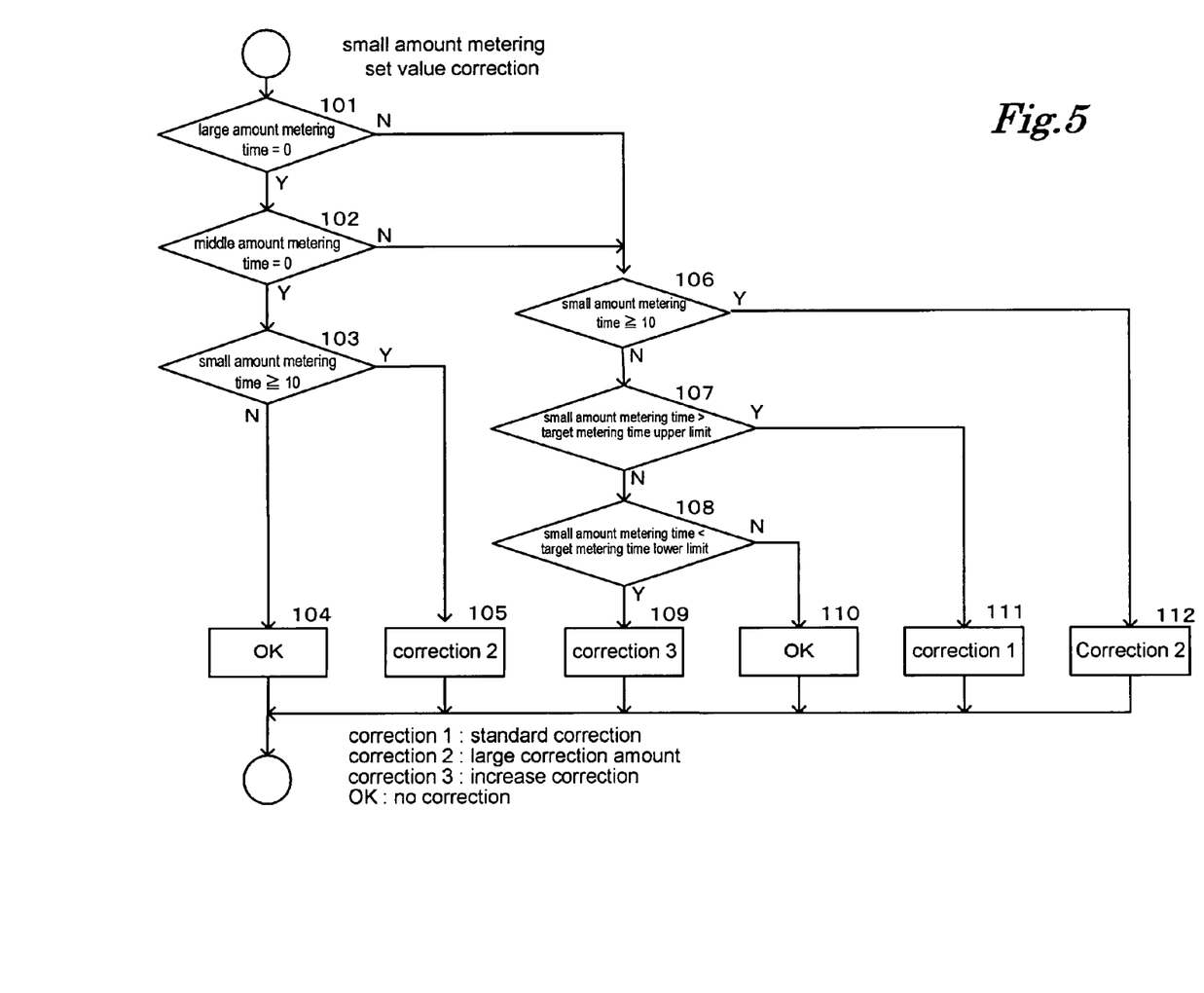
FIG. 5 is a flow chart showing the operation of a set value correction for a small amount metering according to the present system.
Figure 6:
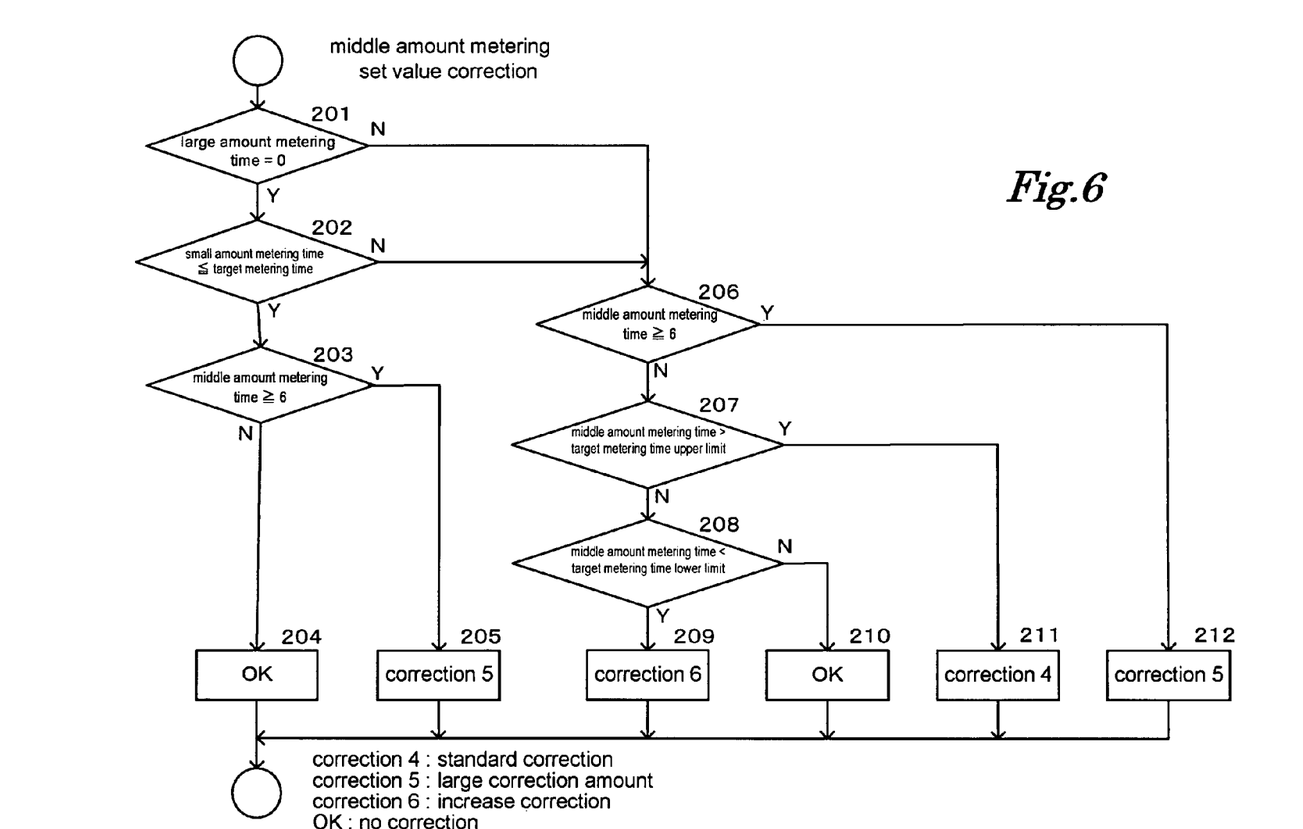
FIG. 6 is a flow chart showing the operation of a set value correction for a middle amount metering according to the present system.

FIG. 3 shows a substantial structure of the system of the present invention, FIG. 4 is a diagrammatic flow chart of the present system, FIG. 5 and FIG. 6 are flow charts showing the logic for correcting the set value at a small amount metering and a middle amount metering, respectively.

The system of the present invention executes a multistage metering control S1 of one batch and a set value correction step S2 for correcting the supply mass switch value at each stage thereafter (see FIG. 4). For this purpose, the present system has a metering process unit 20. The metering process unit 20 has an open degree control means 21 which reads in the metering mass from the load cell 2 and controls the opening degree of the slide shutter 11, a metering time measuring means 22 for measuring the actual metering time at each stage, and a set value correction means 23 for calculating a new supply mass switch value for the next batch metering by correcting the latest supply mass switch value based on a target metering time, a measured actual metering time and several threshold values as mentioned later.

The storage unit 24 stores the target metering time which defines the unstable time value at each stage obtained by experiments as a target lower limit, the initial value of the supply mass switch value at each stage, the correction value per a batch, the value of residual dropping material and other threshold values in order to correct the set value. The initial value of the supply mass switch value at each stage may be input by a setting operation means, not shown.

The metering process unit 20 is designed to control the opening degree of the slide shutter 11 and correct the set value by CPU or programs, not shown. Such a control and correction operations may be executed by a separate unit having CPU, respectively.

Next, the correction process of the supply mass switch value is explained.

Here the three-stage metering, namely large, middle and small, is exemplified and the correction process for the supply mass switch value at middle amount metering (W23 in FIG. 2a) and the correction process for the supply mass switch value at small amount metering (W12 in FIG. 2a) are explained. The supply mass switch value at the large amount metering is calculated by subtracting the supply mass switch value W12 of the middle amount metering and the supply mass switch value W23 of the small amount metering from the final target value W3, so it is not directly corrected.

Correction is executed according to the following conditions using the target metering time stored in the storage unit per each stage of the small amount metering and middle amount metering, the actual metering time measured at the multistage metering, and the supply mass switch value used in the latest metering. A predetermined numerical values are exemplified for the target metering time and the threshold value in the following explanation.

(1) A large initial value is given to the supply mass switch value of the middle amount metering and that of the small amount metering and the supply mass switch value of the middle amount metering and that of the small amount are corrected to be reduced in such a manner that the actual metering time comes close to the target metering time as far as possible.

In this case, correction is not executed at one time to reach the target value, but is executed at several times in order to execute safe and accurate metering until the value optimization is completed. Namely, even when the supply mass switch value is corrected in order to be close to the target metering time, the prediction is not done well at the actual metering and the actual metering time sometimes differed. When an unstable switching is occurred by the difference, the amount of residual dropping material different from a prepared value of residual dropping material is generated, thereby failing the metering. Specifically when the open degree of the material outlet 11 is controlled, the discharge ability and the amount of residual dropping material are often varied.

In order to prevent metering failure till the value optimization, such a correction to largely change the supply mass switch value at the correction process per each metering is not done and a stepwise correction is executed for safety.

(2) Even when the actual metering time exceeds the target metering time, there is a case such that the supply mass switch value is not required to be reduced to the target metering time, namely an exception of (1). The necessity of such exceptional process is judged by comparing the actual metering time and the threshold value at each stage.

For example, in a condition that it is enough ability to complete the entire metering for approximately 10 seconds, when the target metering time of the middle amount metering is set at 3 seconds and the target metering time of the small amount metering is set at 4 seconds, if the actual metering time at the large amount metering and that of the middle amount metering are 0, even if the actual metering time of the small amount metering is 4 seconds and above, if it is less than 10 seconds, the entire time becomes less than 10 seconds. Therefore, the correction to reduce the supply metering switch value of the small amount metering into the target metering time is not executed. In addition, the actual metering time of the large amount metering is 0 and the actual metering time of the small amount metering reaches the target metering time, even when the actual metering time of the middle amount metering is 3 seconds and above, if it is less than 6 seconds, the entire time becomes less than 10 seconds, therefore, the supply metering switch value at the middle amount metering is not corrected to be reduced to the target metering time.

(3) In order to become the actual metering time close to the target metering time, a standard correction amount based on these difference is basically employed as the correction amount (mass value to be subtracted from the latest supply mass switch value). However, when the difference is larger than a predetermined threshold value, the correction amount larger than the standard correction amount is employed. Namely, the standard correction or the correction larger than the standard correction is executed. The upper limit for the standard correction may use the threshold value used in (2) or other value may be selected.

(4) When the actual metering time becomes smaller than the target metering time by the corrections at plural times, increasing correction is executed. This correction is for increasing the supply mass switch value so that the correction amount becomes a negative value.

(5) The upper and lower limits are prepared for the target metering time considering the accidental error, and the correction is stopped when the actual metering time becomes within the values.

The calculation formula of correction amount is exemplified as below. The standard correction is referred as correction 1, the correction with large correction amount is referred as correction 2, and the increasing correction is referred as correction 3 as to the correction for small amount metering. The standard correction is referred as correction 4, the large amount correction is referred as correction 5, and the increasing correction is referred as correction 6 as to the correction for middle amount metering. The correction amount of increasing corrections 3, 6 is calculated from the same formula as that of the standard correction, however, other formula may be employed.

correction amount of correction 1=(actual metering time−target metering time)*correction coefficient "a"  (formula 1)

correction amount of correction 2=actual metering time*correction coefficient "a"  (formula 2)

correction amount of correction 3=(actual metering time−target metering time)*correction coefficient "a"  (formula 3)

correction amount of correction 4=(actual metering time−target metering time)*correction coefficient "b"  (formula 4)

correction amount of correction 5=actual metering time*correction coefficient "b"  (formula 5)

correction amount of correction 6=(actual metering time−target metering time)*correction coefficient "b"  (formula 6)

Wherein, the correction coefficient "a", "b" may be determined in advance using the supply capacity per unit time as a standard. If the supply capacity at the small amount metering is 100 g/sec, that at the middle amount metering is 500 g/sec and correction is executed at "n" times considering the condition (1), the correction coefficient "a" at the small amount metering can be defined as 100/n and the correction coefficient "b" at the middle amount metering can be defined as 500/n. Here, the value "n" may be 2 and above, preferably between 5 to 30.

The reason why correction is executed at plural times is dispersion and hunting (caused by disturbance) of the metering accuracy of the system. The dispersion by the metering accuracy is caused by dispersion of actual metering time caused by the measuring accuracy of the metering time (data import cycle) or the variation of the mechanical accuracy of the supplier such as the hopper 10 or the slide shutter 11 and it is confirmed in the experiments that a double or several times metering error is generated at maximum as a whole. Namely, if metering control is executed under the condition that the supply mass switch value is 190 g, which is obtained by subtracting log from 200 g, as the result, the actual metering amount might be 180 g. In addition, correction is preferably executed at plural times in order to achieve safe metering considering unpredictable conditions like hunting.

The correction amount in the above correction 2 (correction 5) is applied when the actual metering time is largely deviated from the target metering time, the calculation formula does not include the target metering time as an element as understood from the calculation formula. It is to allow the correction amount larger than the correction 1 (correction 4) which is executed when the actual metering time comes to be close to the target metering time as the correction amount. Because the correction coefficient is determined on the condition that correction is executed at plural times, so that even when the target metering time is not included as a factor for calculating the correction amount, the correction amount can be safely adjusted.

Therefore, the calculation formula is not limited to the above, and the following formula may be used in order to satisfy (correction amount of correction 2)>(correction amount of correction 1) and (correction amount of correction 5)>(correction amount of correction 4).

correction amount of correction 1=(actual metering time−target metering time)*correction coefficient a1 correction amount of correction 2=(actual metering time−target metering time)*correction coefficient a2

(wherein correction coefficient a1<correction coefficient a2)

correction amount of correction 4=(actual metering time−target metering time)*correction coefficient b1 correction amount of correction 5=(actual metering time−target metering time)*correction coefficient b2

(wherein correction coefficient b1<correction coefficient b2)

FIG. 5 and FIG. 6 are flow charts showing the operation for set value correction at the small amount metering and the middle amount metering, respectively. These operations are for judging and selecting the corrections 1 to 3 (corrections 4 to 6 at the middle amount metering) or the necessity of correction by checking the threshold values of the actual metering time and are explained hereinafter.

In set value correction of the small amount metering, considering the above conditions (2), correction is executed separately in case of the following two cases (a), (b). Here the threshold value of the actual metering time for judging the correction 1 or 2 is 10 seconds. As the threshold value for determining the necessity of correction, the upper and lower limits (target metering time±α) is preferably employed considering the conditions (5). Namely, if the actual metering time is within the upper and lower limit range, it is judged that correction is unnecessary.

(a) When the actual metering time of the large amount metering and that of the middle amount metering are 0 (steps 101 to 105 in FIG. 5)

When the actual metering time of the small amount metering<10, the supply mass switch value is not corrected.

When the actual metering time of the small amount metering≧10, the correction amount is obtained by the calculation formula (formula 2) of the correction 2 and the supply mass switch value is corrected.

(b) Other than (a) (steps 101, 102, 106 to 112 in FIG. 5)

When the actual metering time of the small amount metering≧10, the correction amount is obtained by the calculation formula (formula 2) of the correction 2 and the supply mass switch value is corrected.

When the target metering time upper limit<the actual metering time of the small amount metering<10, the correction amount is obtained by the calculation formula (formula 1) of the correction 1 and the supply mass switch value is corrected.

When the actual metering time of the small amount metering is within the upper and lower limit range, the supply mass switch value is not corrected.

When the actual metering time of the small amount metering<the target metering time upper limit, the correction amount is obtained by the calculation formula (formula 3) of the correction 3 and the supply mass switch value is corrected.

In set value correction of the middle amount metering, considering the above conditions (2), correction is executed separately in case of the following two cases (c), (d). Here the threshold value of the actual metering time for judging the correction 3 or 4 is 6 seconds. The threshold value for determining the necessity of correction is set as preferably the upper and lower limit (target metering time±β) considering the conditions (5). Namely, if the actual metering time is within the upper and lower limit range, it is judged that correction is unnecessary.

(c) When the actual metering time of the large amount metering is 0 and the actual metering time of the small amount metering≦the target metering time (steps 201 to 205 in FIG. 6)

When the actual metering time of the middle amount metering<6, the supply mass switch value is not corrected.

When the actual metering time of the middle amount metering≧6, the correction amount is obtained by the calculation formula (formula 5) of the correction 5 and the supply mass switch value is corrected.

(d) Other than (c) (steps 201, 202, 206 to 212 in FIG. 6)

When the actual metering time of the middle amount metering≧6, the correction amount is obtained by the calculation formula (formula 5) of the correction 5 and the supply mass switch value is corrected.

When the target metering time upper limit<the actual metering time of the middle amount metering<6, the correction amount is obtained by the calculation formula (formula 4) of the correction 4 and the supply mass switch value is corrected.

When the actual metering time of the middle amount metering is within the upper and lower limit range of the target metering time, the supply mass switch value is not corrected.

When the actual metering time of the middle amount metering<the target metering time upper limit, the correction amount is obtained by the calculation formula (formula 6) of the correction 6 and the supply mass switch value is corrected.

When the correction is judged to be unnecessary in the above-mentioned processes of the small amount metering and the middle amount metering, the supply mass switch value is determined to be optimized and a further multistage metering is executed using the determined supply mass switch value. After completing the optimization, the set value correction is not required to be executed, however, it may be executed because the supply mass switch value is constant as far as the measuring error of metering time is not occurred even when the above process is executed.

As mentioned above, the set value correction means 23 executes algorism for correcting the set value at plural times such that the supply mass switch value at each stage becomes close to the target metering time, thereby achieving an accurate and rapid multistage metering safely and surely.

Further, either one of the standard correction (correction 1 and correction 3) based on the difference between the actual metering time and the target metering time and the correction larger than the standard correction (correction 2 and correction 5) in which the actual metering time and the target metering time are deviated over a predetermined threshold value is to be executed, so that the value can be promptly optimized even when they are largely deviated.

The invention claimed is:

1. A material metering method for metering one batch material till a final target value is obtained in multi stages of large amount metering, middle amount metering and small amount metering in which material drop amount per unit time is gradually reduced while material is supplied into a metering device from a material outlet of a hopper:
   wherein target metering time and an initial value of a supply mass switch value are given for each of said middle amount metering and said small amount metering, said target metering time defining as a target lower limit unstable metering time whose drop amount per unit time after being changed from a prior stage of said metering to the next stage is unstable; and
   wherein said method comprises the steps of:
      calculating said supply mass switch value for said large amount metering by subtracting supply mass switch values for said middle amount metering and said small amount metering from said final target value;
      metering one batch material till said final target value is obtained and measuring actual metering time at said each stage in such a manner that material drop amount per unit time is stepwisely reduced each time material mass value measured with said metering device reaches a supply mass switch value at each stage; and
      calculating correction amount for the next one batch metering for each of said middle amount metering and said small amount metering based on the difference between actual metering time and target metering time of said middle amount metering and said small amount metering and executing correction by subtracting said calculated correction amount from the last supply mass switch value.

2. The material metering method as set forth in claim 1, wherein said multistage metering is executed in such a manner that the material drop amount per unit time is reduced by controlling constricted degree of an opening of said material outlet of said hopper storing material.

3. The material metering method as set forth in claim 1 or 2, wherein the supply mass switch value at said each stage is optimized during plural times of batch metering.

4. The material metering method as set forth in claim 1 or 2, wherein said method uses either of a standard correction amount which is based on the difference between said actual metering time and said target metering time and a large correction amount which is larger than said standard correction when said actual metering time deviates from said target metering times more than a predetermined threshold value in case of calculating said correction amount.

5. The material metering method as set forth in claim 3, wherein said method uses either of a standard correction amount which is based on the difference between said actual metering time and said target metering time and a large correction amount which is larger than said standard correction when said actual metering time deviates from said target metering time more than a predetermined threshold value in case of calculating said correction amount.

* * * * *